Patented Mar. 28, 1950

2,502,324

UNITED STATES PATENT OFFICE 2,502,324

DERIVATIVES OF DIETHYLSTILBESTROL

Emil Kaiser and Jerry Svarz, Chicago, Ill., assignors to Armour and Company, Chicago, Ill., a corporation of Illinois No Drawing. Application May 27, 1946, Serial No. 672,699

4 Claims. (Cl. 260—613)

This invention relates to derivatives of diethylstilbestrol, more particularly to the allyl derivatives of diethylstilbestrol and to methods for their preparation. These new derivative compounds have estrogenic activity in varying degrees and are useful in the synthesis of various useful substances.

We find that diethylstilbestrol may be reacted with allyl halides to prepare a diallyl ether of diethylstilbestrol. This reaction may be carried out in the presence of an alkaline compound capable of reacting with the halogen element of the halide. Examples of such alkaline compounds are potassium carbonate, calcium carbonate, sodium hydroxide, or barium hydroxide. Preferably, the reaction is conducted in an organic solvent which is not reactive with the diallyl ether product. Examples of such organic solvents are methyl-ethyl ketone, acetone, benzene, and the like.

We may use an allyl halide, either the bromide, iodide, or chloride, and preferably in slight excess over the theoretical amount required. The diethylstilbestrol and allyl halide may be mixed in the solvent and heated for several hours to complete the reaction. The diallyl ether product may be recovered suitably by diluting the reaction product with water, extracting the precipitate with ether, drying the extract, and crystallizing from methanol. Other suitable methods of recovery and purification may be used.

The reaction is described by the following formula:

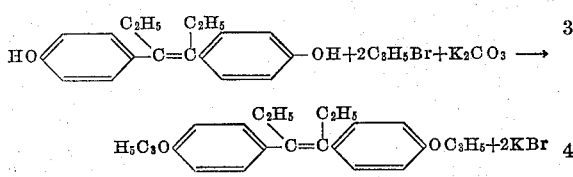

Using a temperature of about 200° C., reaction is found to be complete in 2 to 3 hours. Lower temperatures usually require somewhat longer treatment times. The rearrangement product so produced may suitably be cooled and dissolved in a dilute alkali solution. The alkali solution may be filtered and acidified as with hydrocholic acid, and after a solid precipitate has formed, the 3,3' allyl stilbestrol may be filtered off, washed with water, and crystallized from an organic solvent such as nitromethane. Any suitable method of purification may be employed instead of the procedure just given.

The reaction to prepare 3,3' allyl diethylstilbestrol is described as follows:

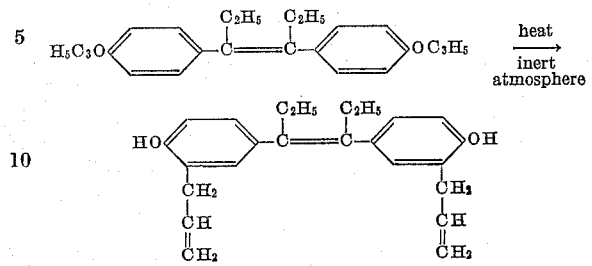

We have further found that 3,3' ally stilbestrol may be converted to 3,3' propenyl diethylstilbestrol by heating in the presence of an alkali, potassium hydroxide, or sodium hydroxide for example. In carrying out this reaction, we prefer to dissolve the alkali and 3,3' allyl diethylstilbestrol in an organic solvent. Yields may be improved by adding to the solution a small quantity of a hydrosulfite salt, such as sodium hydrosulfite. The solution containing the reactants may be heated in an inert atmosphere until the reaction is completed and the reaction product then recovered. When the temperature is held at about 175° C., about two hours is sufficient to complete the reaction. Recovery and purification can be done by any of the well understood procedures.

The reaction to prepare the 3,3' propenyl diethylstilbestrol is described by the following formula:

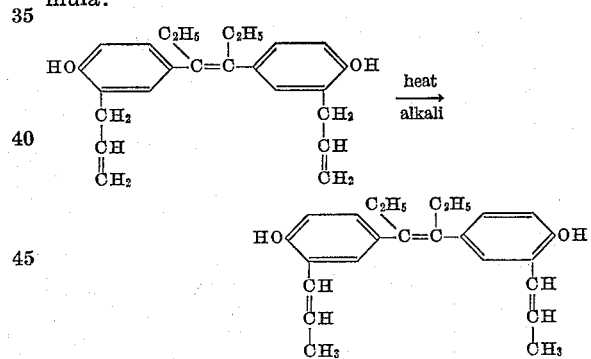

It will be observed that 3,3' propenyl diethylstilbestrol has the double bonds of its side chain in conjugated relation with the double bonds of the aromatic nuclei. The compounds are susceptible to light and turn yellow upon exposure.

Specific examples of the preparation of allyl derivatives of diethylstilbestrol follow:

EXAMPLE 1

*Preparation of the diallyl ether of diethylstilbestrol*

13.4 grams of diethylstilbestrol was dissolved in 40 cc. of methyl-ethyl ketone. 14.0 grams of anhydrous potassium carbonate and 12.1 grams of allyl bromide were added to the solution and the whole mixture refluxed for 7 hours. Then the methyl-ethyl ketone solution, without filtration, was diluted with water. The precipitate, which was formed by the dilution, was extracted with ether, the ether washed with a 5% alkali solution and then with water. The ether solution was dried with sodium sulfate, evaporated to dryness and the residue crystallized from methanol. 9.5 grams of crystalline stilbestrol allyl ether was obtained having a melting point of 92–93° C.

EXAMPLE 2

*Preparation of the diallyl ether of diethylstilbestrol*

10 grams of diethylstilbestrol and 9.1 grams of allyl bromide were dissolved in 30 cc. of methyl ethyl ketone. 10.5 grams of anhydrous potassium carbonate was added and the solution refluxed for 8 hours. After cooling, water was added and the emulsion was extracted with ether. The ether layer was washed twice with a 10% potassium hydroxide solution and then with water. The ether solution was dried and then evaporated. The residue was crystallized twice from isopropanol. The diallyl ether of diethylstilbestrol crystallized in shiny needles and the melting point was found to be 93–93.5° C. The yield was 9 grams.

Anal.—Calcd. for $C_{24}H_{28}O_2$: C, 82.72%; H, 8.10%. Found: C, 82.47%; H, 8.24%.

EXAMPLE 3

*Preparation of 3,3′ allyl diethylstilbestrol*

The diallyl ether of diethylstilbestrol, prepared as set forth in Example 1, in the amount of 7.2 grams was kept at 195–200° C. for 3 hours in a nitrogen atmosphere. The rearrangement product was cooled and dissolved in 5% alkali solution. The alkali solution was filtered and acidified with hydrochloric acid. The oily solution precipitated overnight and was filtered off and washed with water. After drying there was obtained 6.1 grams of crude 3,3′ allyl diethylstilbestrol. The crude material was crystallized from nitro-methane.

EXAMPLE 4

*Preparation of 3,3′ allyl diethylstilbestrol*

9 grams of the diallyl ether of diethylstilbestrol was dissolved in 30 cc. of diethylaniline and the solution refluxed for four hours in an atmosphere of nitrogen. After cooling, 400 cc. of 2 N hydrochloric acid was added and the emulsion extracted with ether. The ether layer was washed with N hydrochloric acid followed by a water washing and was then evaporated to dryness. The residue was treated with a 10% potassium hydroxide solution and the cloudy alkaline solution clarified by filtration with a small amount of charcoal. The filtrate was acidified with hydrochloric acid. An oily precipitate settled out. The precipitate solidified after standing overnight and was filtered off. The substance was dried in a vacuum desiccator and then dissolved in 20 cc. of ether, and low boiling petroleum ether added until cloudiness developed. The cloudy solution was kept overnight at —5° C. A sticky brown precipitate settled out and was removed by filtration. The almost colorless filtrate was concentrated and several volumes of petroleum ether added. By cooling to 5–10° C. a crystalline precipitate was formed which was filtered off. In a similar manner more material was crystallized out from the mother liquor. The combined fractions weighed 5.3 grams and melted at 1.3–1.5° C. By fractional crystallization of this material, 2.25 grams of 3,3′ allyl diethylstilbestrol was obtained having a melting point of 103–104° C.

Anal.—Calcd. for $C_{24}H_{28}O_2$: C, 82.72%; H, 8.10%. Found: C, 82.41%; H, 7.94%.

EXAMPLE 5

*Preparation of 3,3′ propenyl diethylstilbestrol*

9 grams of potassium hydroxide was dissolved by heating and stirring in 50 cc. diethylene glycol. 4.5 grams of 3,3′ allyl diethylstilbestrol, prepared as in Example 4, together with 0.3 grams of sodium hydrosulfite dissolved in 2 cc. of water was added to the diethyleneglycol solution. The reaction mixture was kept in an oil bath of 170–180° for two hours in an atmosphere of nitrogen. After cooling, the solution was diluted with water, acidified with hydrochloric acid and extracted with ether. The ether layer was washed with water, dried and concentrated by heating and bubbling nitrogen through the solution. To the concentrated ether solution petroleum ether was added until cloudiness developed. Left overnight at room temperature a dark oil settled out which was discarded. The yellow upper layer was poured off and treated again with petroleum ether. This procedure was repeated until the upper layer became colorless. This upper layer was then concentrated in a nitrogen atmosphere to a small volume. Petroleum ether was added and the solution kept at 5–10° C. The 3,3′ propenyl diethylstilbestrol crystallized out and was recrystallized from a mixture of ether-petroleum ether. The melting point of the 3,3′ propenyl diethylstilbestrol product was 120–121° C.

Anal.—Calcd. for $C_{24}H_{28}O_2$: C, 82.76%; H, 8.10%. Found: C, 81.10%; H, 8.30%.

From the 3,3′ propenyl diethylstilbestrol melting at 120–121° C., a very small amount of a fraction could be obtained which softened at 122° C. and melted at 143–144° C. This fraction crystallized out when a diluted ether-petroleum ether solution of the material melting at 120–121° C. was kept at —5° C. for several days.

In the foregoing detailed description we have given many specific examples and procedures illustrating the invention. It is understood that these specific examples are illustration only and that the invention can be practiced in a great variety of ways.

We claim:
1. 3,3′ allyl diethylstilbestrol.
2. 3,3′ propenyl diethylstilbestrol.
3. A compound having the formula

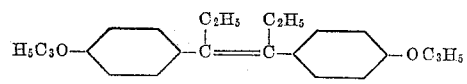

4. A compound selected from the class consisting of

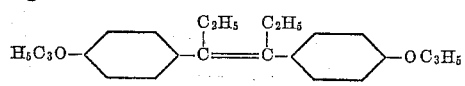

the 3,3' allyl diethylstilbestrol derivative thereof, and the 3,3' propenyl diethylstilbestrol derivative thereof.

EMIL KAISER.
JERRY SVARZ.

REFERENCES CITED

The following references are of record in the file of this patent:

UNITED STATES PATENTS

| Number | Name | Date |
|---|---|---|
| 1,787,036 | Ehrlich | Dec. 30, 1930 |
| 2,385,468 | Reid | Sept. 25, 1945 |

FOREIGN PATENTS

| Number | Country | Date |
|---|---|---|
| 24,932 | Germany | Jan. 22, 1914 |

OTHER REFERENCES

Reid and Wilson, Journal of American Chemical Society, vol. 64, pages 1625–1626, July 1942, "Some Mono- and Di-alkyl Ethers of Stilboestrol."